US009552156B2

(12) United States Patent
Chin et al.

(10) Patent No.: US 9,552,156 B2
(45) Date of Patent: Jan. 24, 2017

(54) METHOD FOR OPERATING SOFT KEYBOARD OF TOUCHING DEVICE AND THE SAME TOUCHING DEVICE

(71) Applicant: HTC Corporation, Taoyuan County (TW)

(72) Inventors: Chia-Hao Chin, Taoyuan County (TW); Yen-Kuan Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/503,421

(22) Filed: Oct. 1, 2014

(65) Prior Publication Data

US 2016/0098188 A1    Apr. 7, 2016

(51) Int. Cl.
*G06F 3/041* (2006.01)
*G06F 3/0488* (2013.01)
*G06F 3/0484* (2013.01)
*G06F 3/0486* (2013.01)

(52) U.S. Cl.
CPC ......... *G06F 3/04886* (2013.01); *G06F 3/0486* (2013.01); *G06F 3/04845* (2013.01)

(58) Field of Classification Search
CPC ....... G06F 8/34; G06F 3/04886; G06F 3/0481
USPC ......... 345/170–178; 715/771, 773, 788, 798, 715/800
See application file for complete search history.

(56) References Cited

U.S. PATENT DOCUMENTS

| 2010/0241985 | A1* | 9/2010 | Kim .................... G06F 3/04886 715/773 |
| 2010/0277414 | A1 | 11/2010 | Tartz |
| 2015/0128081 | A1* | 5/2015 | Hsieh .................. G06F 3/04886 715/773 |

FOREIGN PATENT DOCUMENTS

| TW | I313430 | 8/2009 |
| TW | 201337720 A | 9/2013 |

OTHER PUBLICATIONS

Notice of Allowance mailed/issued on Nov. 4, 2016 for TW application No. 104101223, filing date: Jan. 14, 2015, pp. 1-4.

* cited by examiner

*Primary Examiner* — Michael Pervan
*Assistant Examiner* — Andrew Lee
(74) *Attorney, Agent, or Firm* — Winston Hsu; Scott Margo

(57) ABSTRACT

A method for operating a soft keyboard of a touch device is disclosed, the touch device including a touch screen and a processor, the touch screen being coupled to the processor, and the method including: the processor determining a touch signal generated from a single touch point applied onto a trigger region for the soft keyboard; the processor determining a drag signal generated through move of the single touch point from inside of the trigger region to outside of the trigger region; the processor determining a starting point and an end point of the drag signal, to generate a soft keyboard display signal; and displaying the soft keyboard on the touch screen according to the soft keyboard display signal.

2 Claims, 13 Drawing Sheets

METHOD FOR OPERATING SOFT KEYBOARD OF TOUCHING DEVICE AND THE SAME TOUCHING DEVICE

TECHNICAL FIELD

The present disclosure relates to a touch device and a method for operating a soft keyboard of a touch device.

BACKGROUND

Typically, a user performs inputting operation through a soft keyboard displayed on a touch device when using the touch device. In the related art, it typically needs two fingers to simultaneously perform an expanding or shrinking operation to change a size of the soft keyboard. Moreover, in the related art, the soft keyboard is typically displayed as a whole.

SUMMARY

According to some embodiments of the present disclosure, a method for operating a soft keyboard of a touch device is disclosed, in which the touch device includes a touch screen and a processor, the touch screen is coupled to the processor. The method includes: the processor determines a touch signal generated from a single touch point applied onto a trigger region for the soft keyboard; the processor determines a drag signal generated through move of the single touch point from inside to outside of the trigger region; the processor determines a starting point and an end point of the drag signal, to generate a soft keyboard display signal; and the soft keyboard is displayed on the touch screen according to the soft keyboard display signal.

According to some embodiments of the present disclosure, a method for operating a soft keyboard of a touch device is disclosed, in which the touch device includes a touch screen and a processor, the touch screen is coupled to the processor. The method includes: a first soft keyboard is displayed on the touch screen; the processor determines a swipe signal applied on the touch screen to determine a boundary of a second soft keyboard; the processor determines a click signal applied on the touch screen to determine a shrinking direction of the second soft keyboard; and the first soft keyboard is shrunk into the second soft keyboard on the touch screen according to the boundary and the shrinking direction of the second soft keyboard.

According to some embodiments of the present disclosure, a method for operating a soft keyboard of a touch device is disclosed, in which the touch device includes a touch screen and a processor, the touch screen is coupled to the processor. The method includes: a first soft keyboard is displayed on the touch screen; the processor determines a first swipe signal applied on the touch screen to determine a boundary of a first part of the first soft keyboard; the processor determines a second swipe signal applied on the touch screen to determine a boundary of a second part of the first soft keyboard; and the first soft keyboard is divided into the first part and the second part on the touch screen according to the boundaries of the first part and the second part of the first soft keyboard.

According to some embodiments of the present disclosure, a touch device is disclosed. The touch device includes: a touch screen including a trigger region for a soft keyboard; a memory configured to store computer executable instructions; and a processor coupled to the touch screen and configured to execute the computer executable instructions to cause the device to perform: determining, by the processor, a touch signal generated from a single touch point applied onto a trigger region for the soft keyboard; determining, by the processor, a drag signal generated through move of the single touch point from inside to outside of the trigger region; determining, by the processor, a starting point and an end point of the drag signal, to generate a soft keyboard display signal; and displaying the soft keyboard on the touch screen according to the soft keyboard display signal.

According to some embodiments of the present disclosure, a touch device is disclosed. The touch device includes: a touch screen including a trigger region for a soft keyboard; a memory configured to store computer executable instructions; and a processor coupled to the touch screen and configured to execute the computer executable instructions to cause the device to perform: displaying a first soft keyboard on the touch screen; determining, by the processor, a swipe signal applied on the touch screen to determine a boundary of a second soft keyboard; determining, by the processor, a click signal applied on the touch screen to determine a shrinking direction of the second soft keyboard; and shrinking the first soft keyboard into the second soft keyboard on the touch screen according to the boundary and the shrinking direction of the second soft keyboard.

According to some embodiments of the present disclosure, a touch device is disclosed. The touch device includes: a touch screen including a trigger region for a soft keyboard; a memory configured to store computer executable instructions; and a processor coupled to the touch screen and configured to execute the computer executable instructions to cause the device to perform: displaying a first soft keyboard on the touch screen; determining, by the processor, a first swipe signal applied on the touch screen to determine a boundary of a first part of the first soft keyboard; determining, by the processor, a second swipe signal applied on the touch screen to determine a boundary of a second part of the first soft keyboard; and dividing the first soft keyboard into the first part and the second part on the touch screen according to the boundaries of the first part and the second part of the first soft keyboard.

According to some embodiments of the present disclosure, a touch device is disclosed. The touch device includes: a touch screen including a trigger region for a soft keyboard; a signal processing module configured to determine a touch signal generated from a single touch point applied onto a trigger region for the soft keyboard, and to determine a drag signal generated through move of the single touch point from inside to outside of the trigger region; and a soft keyboard processing module configured to generate a soft keyboard display signal according to a starting point and an end point of the drag signal. The touch screen displays the soft keyboard according to the soft keyboard display signal.

Alternatively, the soft keyboard processing module is configured to take the starting point of the drag signal as a first vertex of the soft keyboard, to takes the end point of the drag signal as a second vertex of the soft keyboard, and to generate the soft keyboard display signal according to a length of a diagonal of the soft keyboard. The length of the diagonal of the soft keyboard is equal to a distance from the first vertex to the second vertex.

Alternatively, the trigger region for the soft keyboard includes at least a part of the region of an input box corresponding to the soft keyboard.

According to some embodiments of the present disclosure, a touch device is disclosed. The touch device includes: a touch screen configured to display a first soft keyboard; a signal processing module configured to determine a swipe signal applied on the touch screen to determine a boundary of a second soft keyboard, and to determine a click signal applied on the touch screen to determine a shrinking direction of the second soft keyboard; and a soft keyboard processing module configured to shrink the first soft keyboard into the second soft keyboard according to the boundary and the shrinking direction of the second soft keyboard.

Alternatively, the signal processing module is configured to determine the swipe signal which moves continuously on the first soft keyboard for a distance in a direction perpendicular to a lower edge of the first soft keyboard, so as to determine the boundary of a second soft keyboard. The signal processing module is also configured to determine the click signal applied on the first key board to determine the shrinking direction of the second soft keyboard.

Alternatively, the signal processing module is configured to determine a touch signal generated from a single touch point applied on the touch screen, so as to determine an upper boundary of the second soft keyboard. The signal processing module is configured to determine a downward drag signal generated from the single touch point, to determine a side boundary of the second soft keyboard.

Alternatively, the signal processing module is configured to determine a swipe signal perpendicular to the lower edge of the first soft keyboard on the touch screen, so as to determine the boundary of the second soft keyboard.

According to some embodiments of the present disclosure, a touch device is disclosed. The touch device includes: a touch screen configured to display a first soft keyboard; a signal processing module configured to determine a first swipe signal applied on the touch screen so as to determine a boundary of a first part of the first soft keyboard, and configured to determine a second swipe signal applied on the touch screen so as to determine a boundary of a second part of the first soft keyboard; and a soft keyboard processing module configured to divide the first soft keyboard into the first part and the second part according to the boundaries of the first part and the second part of the first soft keyboard.

Alternatively, the signal processing module is configured to determine the first swipe signal which moves continuously on the first soft keyboard for a distance in a direction perpendicular to a lower edge of the first soft keyboard, so as to determine the boundary of the first part; and configured to determine the second swipe signal which swipes continuously on the first soft keyboard for a distance in a direction perpendicular to the lower edge of the first soft keyboard, so as to determine the boundary of the second part.

Alternatively, the signal processing module is configured to determine the first swipe signal perpendicular to the lower edge of the first soft keyboard on the touch screen, so as to determine the boundary of the first part; and configured to determine the second swipe signal perpendicular to the lower edge of the first soft keyboard on the touch screen, so as to determine the boundary of the second part.

Alternatively, the signal processing module is configured to determine a touch signal generated from a single touch point applied on the touch screen to determine an upper boundary of the first part and an upper boundary of the second part; configured to determine a downward drag signal generated from the single touch point to determine a side boundary of the first part; and configured to determine a second swipe signal applied on the touch screen so as to determine a side boundary of the second part of the first soft keyboard.

DETAILED DESCRIPTION

Hereinafter, embodiments of the present disclosure will be described in detail. It should be noted that the embodiments described herein are merely for illustration, rather than limitation of the scope of the present application.

Hereinafter, "touch device" means a device provided with a touch screen, including a mobile phone, a PAD, and the like.

Figure 1:
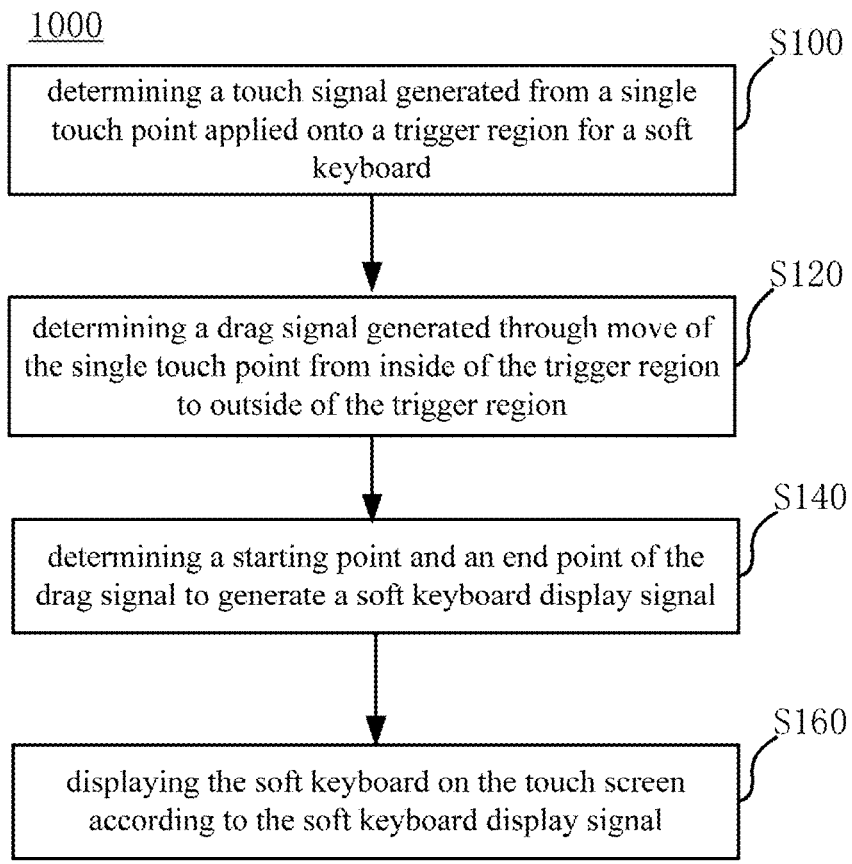
FIG. 1 is a flowchart showing a method 1000 for operating a soft keyboard of a touch device according to an embodiment of the present disclosure.

FIG. 1 is a flowchart showing a method 1000 for operating a soft keyboard of a touch device according to an embodiment of the present disclosure.

As shown in FIG. 1, at step S100, a processor determines a touch signal generated from a single touch point applied onto a trigger region for a soft keyboard. At step S120, the processor determines a drag signal generated through move of the single touch point from inside to outside of the trigger region. At step S140, the processor determines a starting point and an end point of the drag signal to generate a soft keyboard display signal. At step S160, the processor makes the soft keyboard be displayed on a touch screen according to the soft keyboard display signal.

Figure 2:
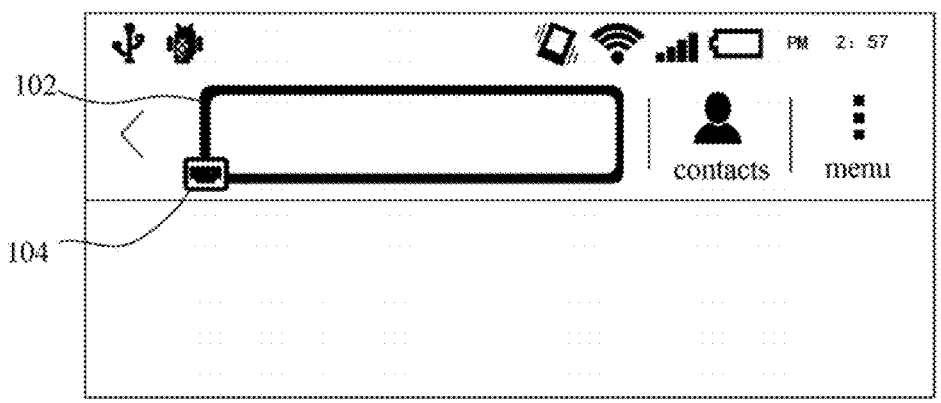
FIG. 2 is a schematic view showing a trigger region displayed on a touch screen for a soft keyboard according to an embodiment of the present disclosure.
Figure 3:
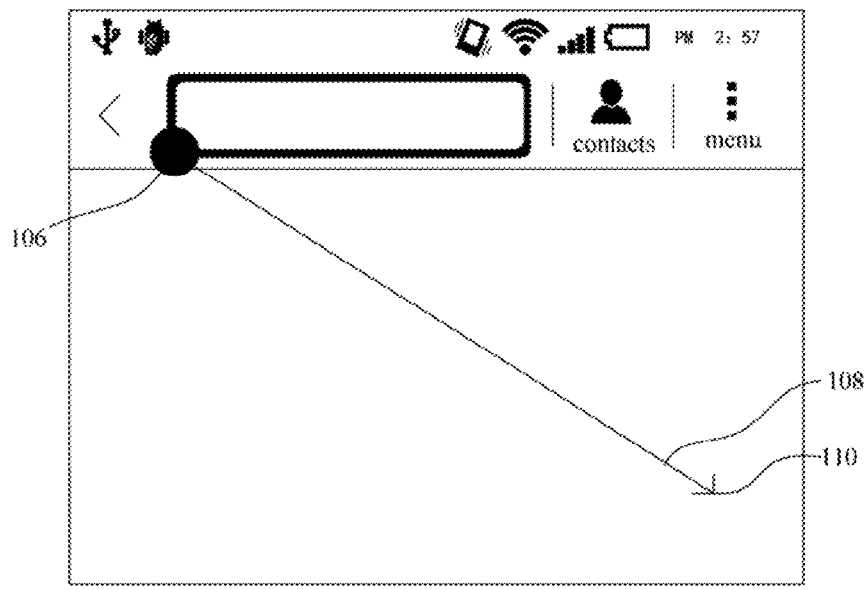
FIG. 3 is a schematic view showing a touch signal generated from a single touch point applied in the trigger region for the soft keyboard, and a drag signal generated through move of the single touch point from inside to outside of the trigger region, according to an embodiment of the present disclosure.
Figure 4:
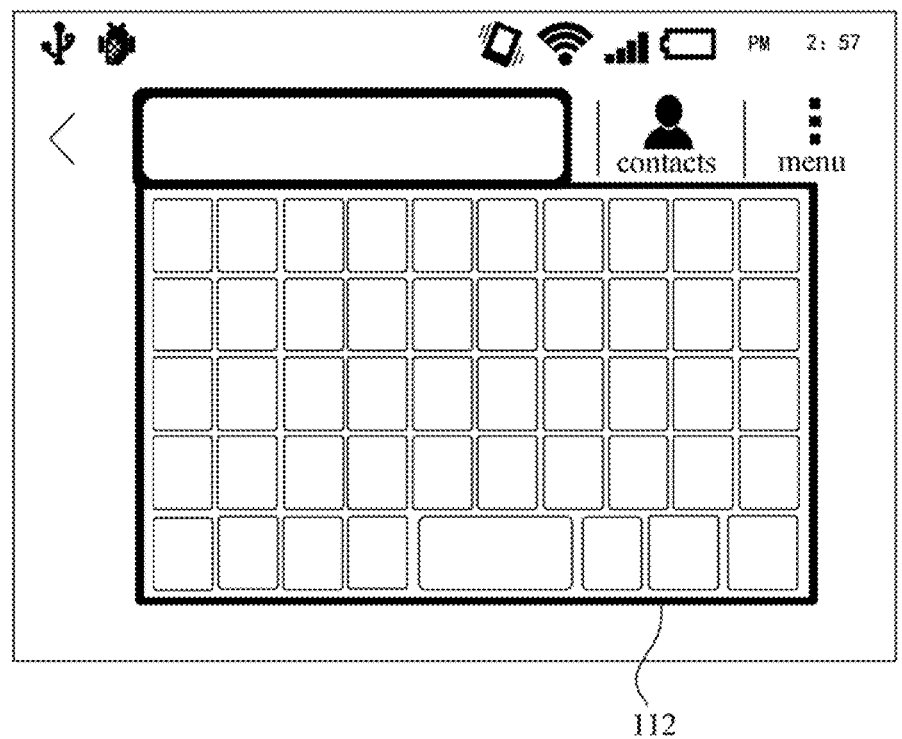
FIG. 4 is a schematic view showing a second soft keyboard displayed through the method 1000 for operating a soft keyboard of a touch device according to an embodiment of the present disclosure.

For example, FIG. 2 is a schematic view showing a trigger region displayed on a touch screen for a soft keyboard. FIG. 3 is a schematic view showing a touch signal generated from a single touch point applied in the trigger region for the soft keyboard, and a drag signal generated through move of the single touch point from inside to outside of the trigger region, according to an embodiment of the present disclosure. FIG. 4 is a schematic view showing a second soft keyboard displayed through the method 1000 for operating a soft keyboard of a touch device according to an embodiment of the present disclosure.

As shown in FIG. 2, an input box 102 may be, for example, a trigger region for the soft keyboard. Alternatively, the trigger region for the soft keyboard may be located in the corresponding input box for the soft keyboard. Alternatively, the trigger region for the soft keyboard may include at least a part of the region of the corresponding input box for the soft keyboard, i.e., the trigger region for the soft keyboard is partially overlapped with the corresponding part of the input box for the soft keyboard.

At step S100, the processor determines a touch signal 106 generated from a single touch point applied in the input box, as shown in FIG. 3. At step S120, the processor determines a drag signal 108 generated through move of the single touch point from inside of the input box to outside of the input box, as shown in FIG. 3. At step S140, the processor determines a starting point 106 and an end point 110 of the drag signal to generate a soft keyboard display signal. At step S160, the processor makes the soft keyboard 112 be displayed on a touch screen according to the soft keyboard display signal, as shown in FIG. 4.

Alternatively, at step S140, the processor takes the starting point 106 of the drag signal 108 as a first vertex of the soft keyboard, takes the end point 110 of the drag signal 108 as a second vertex of the soft keyboard, and generates a soft keyboard display signal according to a length of a diagonal which is equal to a distance from the first vertex to the second vertex of the soft keyboard.

In some embodiments, the input box 102 may include a soft keyboard icon 104 therein, as shown in FIG. 2. At step S100, the processor determines a touch signal 106 applied on the soft keyboard icon 104, as shown in FIG. 3. At step S120, the processor determines the drag signal 108 generated through move of the single touch point from inside of the input box to outside of the input box, as shown in FIG. 3. At step S140, the processor takes the starting point (which is corresponding to the position of the soft keyboard icon 104) of the drag signal 108 as the first vertex of the soft keyboard, takes the end point 110 of the drag signal 108 as the second vertex, and generates a soft keyboard display signal according to the length of the diagonal of the soft keyboard which is equal to the distance from the first vertex to the second vertex of the soft keyboard. At step S160, the processor makes the soft keyboard 112 to be displayed on the touch screen according to the soft keyboard display signal.

According to the above embodiments, the size of the soft keyboard may be adjusted by determining a touch signal generated from a single touch point applied onto the trigger region for the soft keyboard and a drag signal generated through move of the single touch point from inside to outside of the trigger region, operation of which is easy and only needs one finger of the user.

Figure 5:
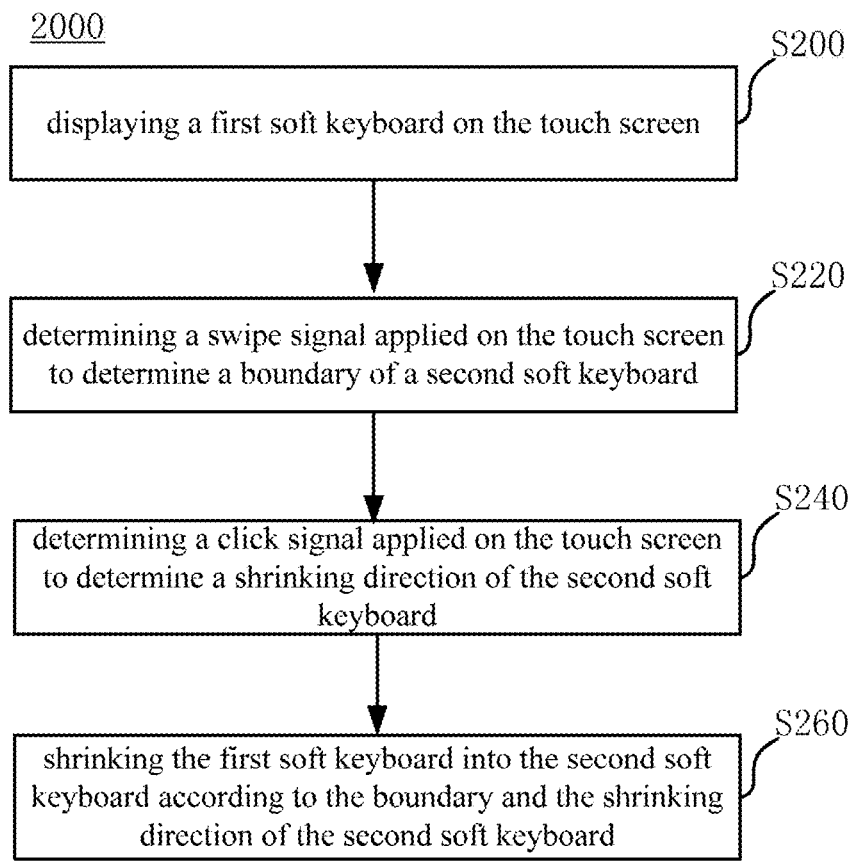
FIG. 5 is a flowchart showing a method 2000 for operating a soft keyboard of a touch device according to an embodiment of the present disclosure.
Figure 6:
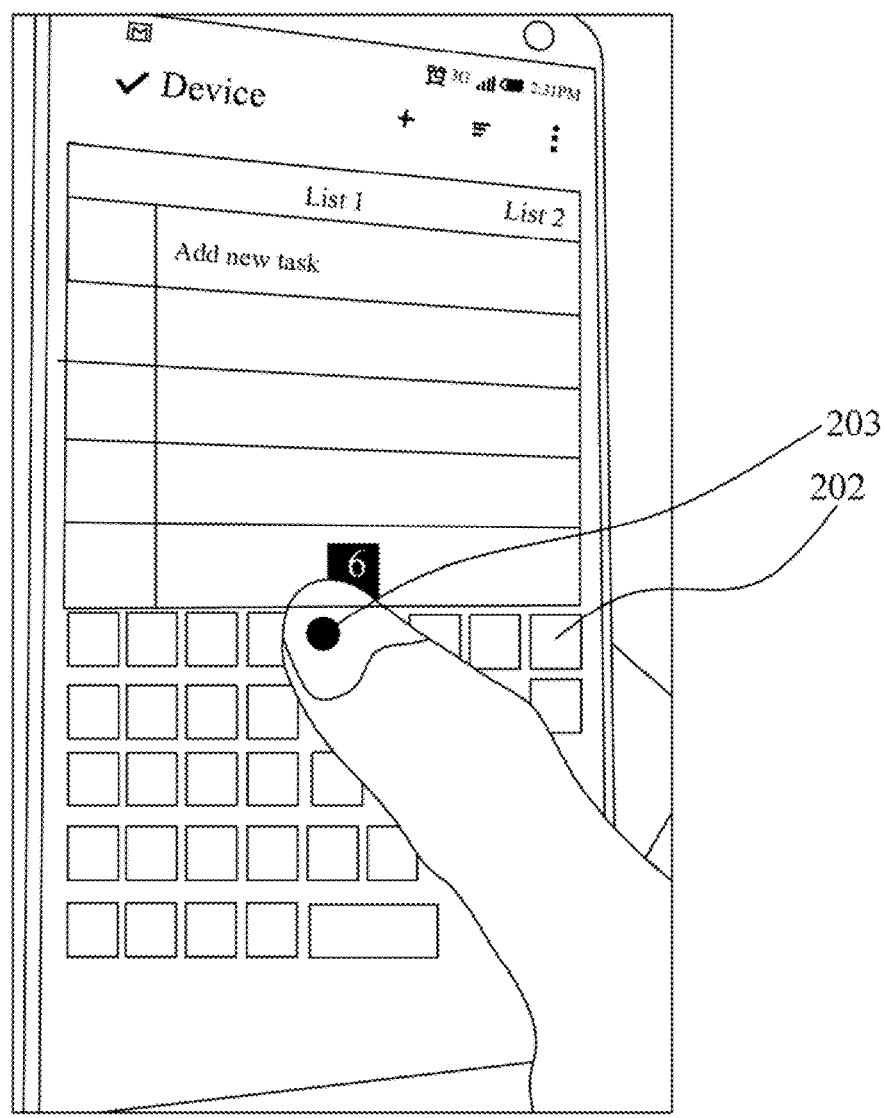
FIG. 6 is a schematic view showing a first soft keyboard displayed on a touch screen according to an embodiment of the present disclosure.
Figure 8:
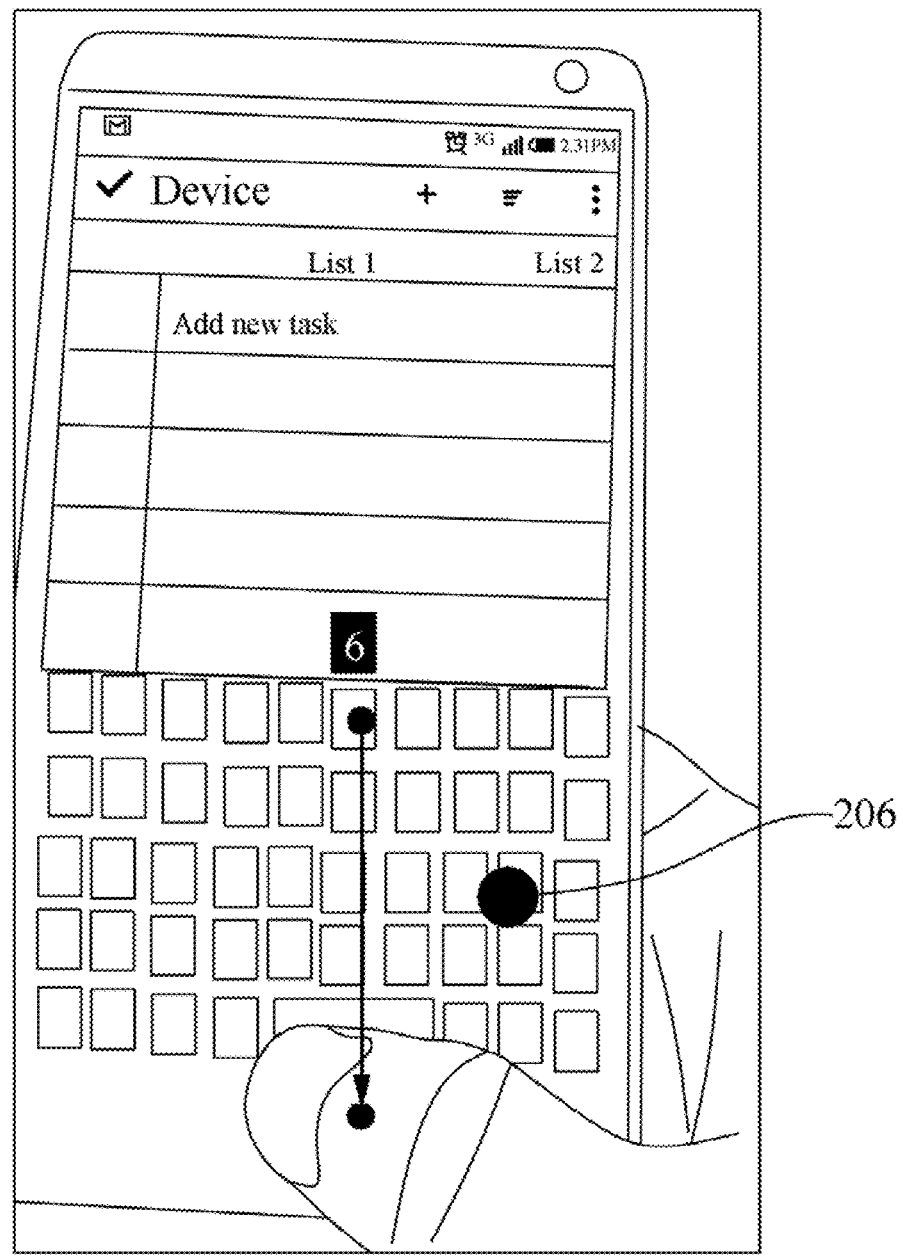
FIG. 8 is a schematic view showing determination of a side boundary of the second soft keyboard according to an embodiment of the present disclosure.
Figure 9:
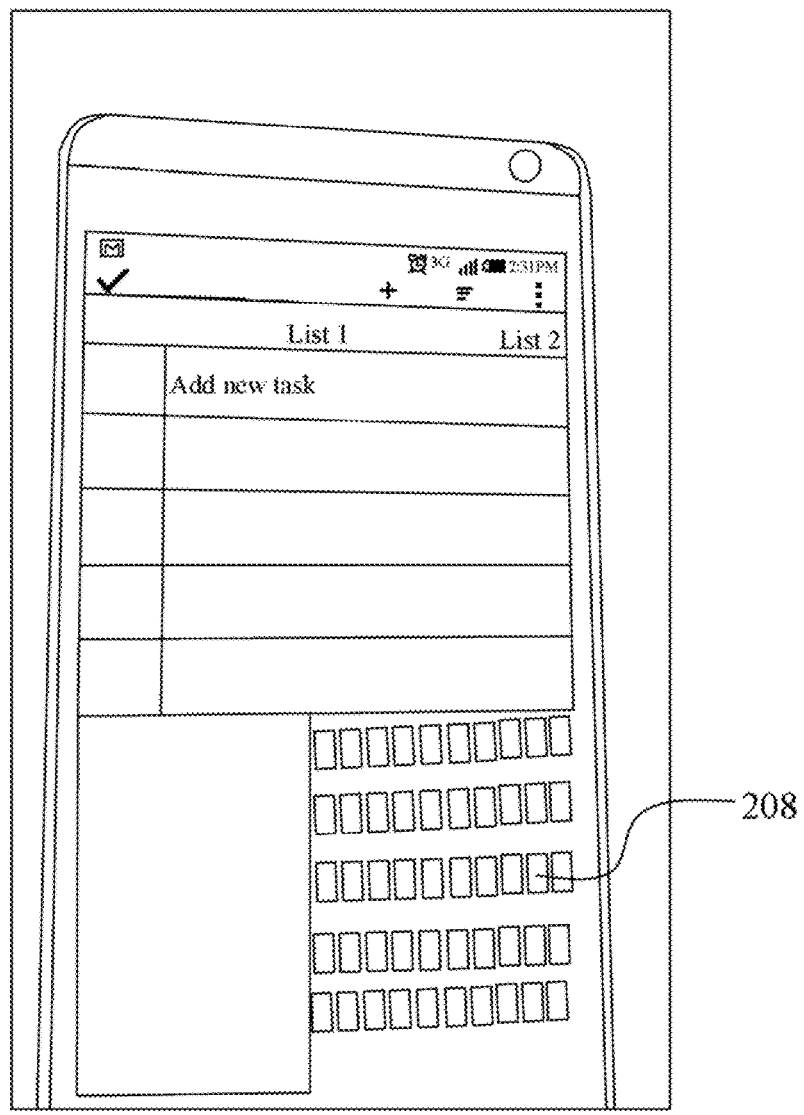
FIG. 9 is a schematic view showing determination of a shrinking direction of the second soft keyboard according to an embodiment of the present disclosure.
Figure 10:
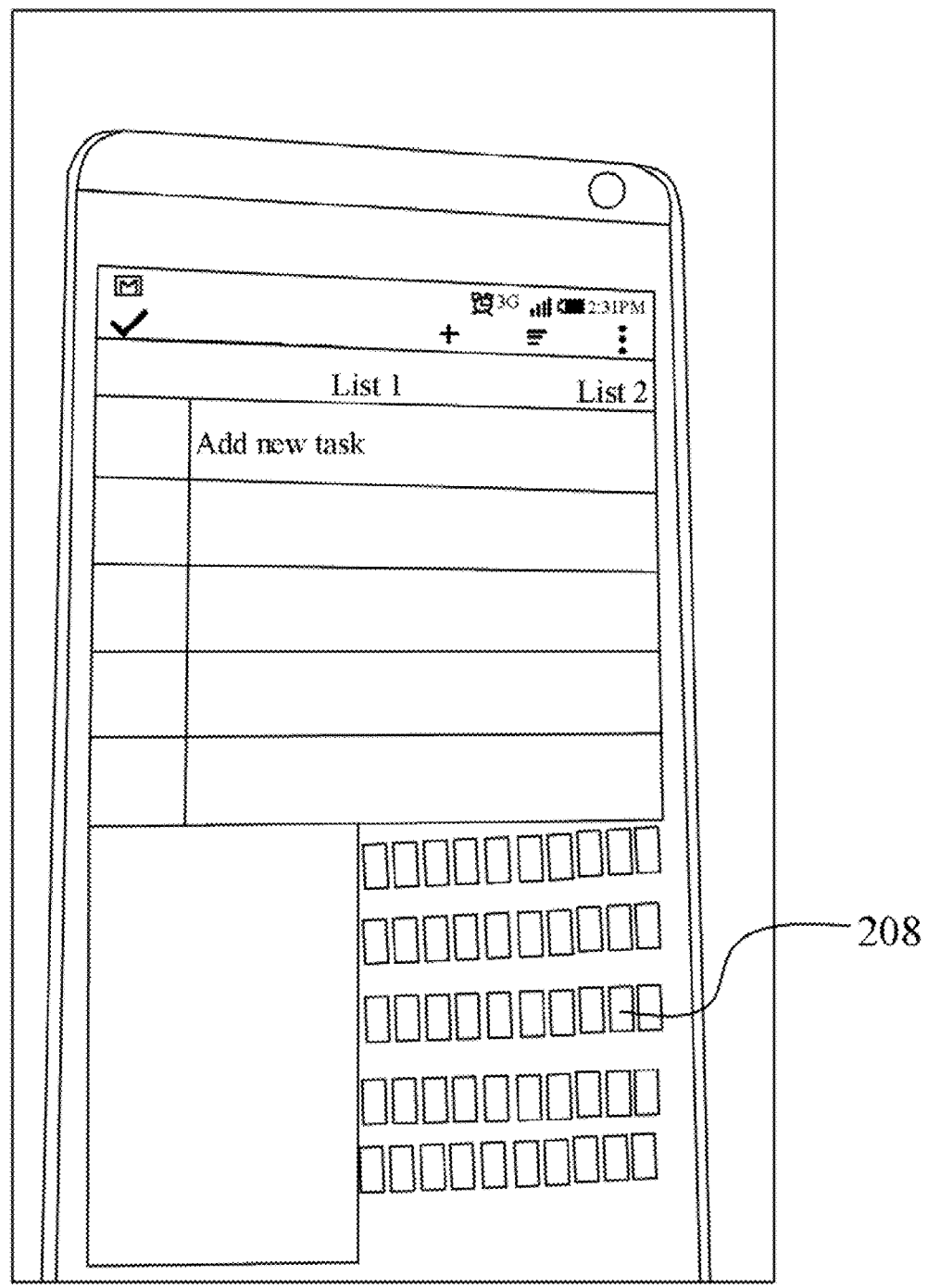
FIG. 10 is a schematic view showing the second soft keyboard according to an embodiment of the present disclosure.

FIG. 5 is a flowchart showing a method 2000 for operating a soft keyboard of a touch device according to an embodiment of the present disclosure. FIG. 6 is a schematic view showing a first soft keyboard displayed on a touch screen according to an embodiment of the present disclosure. FIG. 8 is a schematic view showing determination of a side boundary of a second soft keyboard according to an embodiment of the present disclosure. FIG. 9 is a schematic view showing determination of a shrinking direction of the second soft keyboard according to an embodiment of the present disclosure. FIG. 10 is a schematic view showing the second soft keyboard according to an embodiment of the present disclosure.

For example, at step S200, a first soft keyboard is displayed on the touch screen. For example, a first soft keyboard 202 is displayed on the touch screen, as shown in FIG. 6.

At step S220, the processor determines a swipe signal applied on the touch screen to determine a boundary of a second soft keyboard. For example, the processor determines a swipe signal 204 applied on the touch screen, as shown in FIG. 8. For example, the swipe signal 204 moves continuously on the first soft keyboard 202 for a distance in a direction perpendicular to a lower edge of the first soft keyboard 202, so as to determine a side boundary of the second soft keyboard. Alternatively, the processor may determines a swipe signal which moves continuously on the first soft keyboard for a distance in a direction substantially perpendicular to a lower edge of the first soft keyboard 202, so as to determine a side boundary of the second soft keyboard.

At step S240, the processor determines a click signal applied on the touch screen to determine a shrinking direction of the second soft keyboard. For example, the processor determines a click signal 206 applied on the first soft keyboard 202, as shown in FIG. 9, so as to determine a shrinking direction of the second soft keyboard. That is, the shrinking direction of the second soft keyboard is determined on whether the click signal applied on the first soft keyboard is at a left side or a right side of the swipe signal.

At step S260, the first soft keyboard is shrunk into the second soft keyboard on the touch screen according to the boundary and the shrinking direction of the second soft keyboard. For example, the side boundary of the second soft keyboard is determined according to the swipe signal 204 shown in FIG. 8, and the shrinking direction of the second soft keyboard is determined according to the click signal 206 shown in FIG. 9. The click signal 206 is located on the right side of the swipe signal 204 as shown in FIG. 9, therefore the first soft keyboard 202 is shrunk to the right side to be shrunk into the second soft keyboard 208, as shown in FIG. 10. Alternatively, a size of each key of the first soft keyboard 202 is shrunk according to a ratio between the size of the first soft keyboard and the size of the second soft keyboard.

Figure 11:
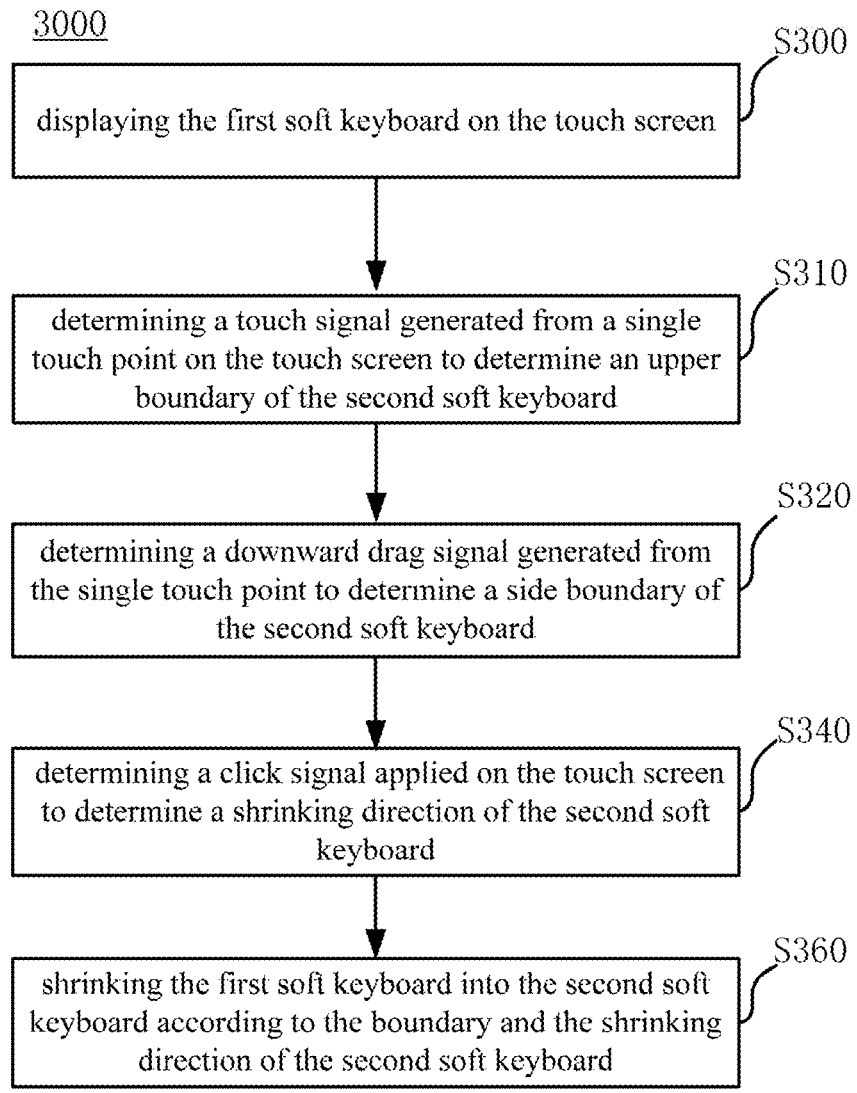
FIG. 11 is a flowchart showing a method 3000 for operating a soft keyboard of a touch device according to an embodiment of the present disclosure.

FIG. 11 is a flowchart showing a method 3000 for operating a soft keyboard of a touch device according to an embodiment of the present disclosure. As shown in FIG. 11, at step S300, the first soft keyboard is displayed on the touch screen. At step S310, the processor determines a touch signal generated from a single touch point applied on the touch screen to determine an upper boundary of the second soft keyboard. At step S320, the processor determines a downward drag signal generated from the single touch point, to determine a side boundary of the second soft keyboard. At step S340, the processor determines a click signal applied on the touch screen to determine a shrinking direction of the second soft keyboard. At step S360, the first soft keyboard is shrunk into the second soft keyboard on the touch screen according to the boundary and the shrinking direction of the second soft keyboard.

For example, at step S300, the first soft keyboard 202 is displayed on the touch screen, as shown in FIG. 6.

Figure 7:
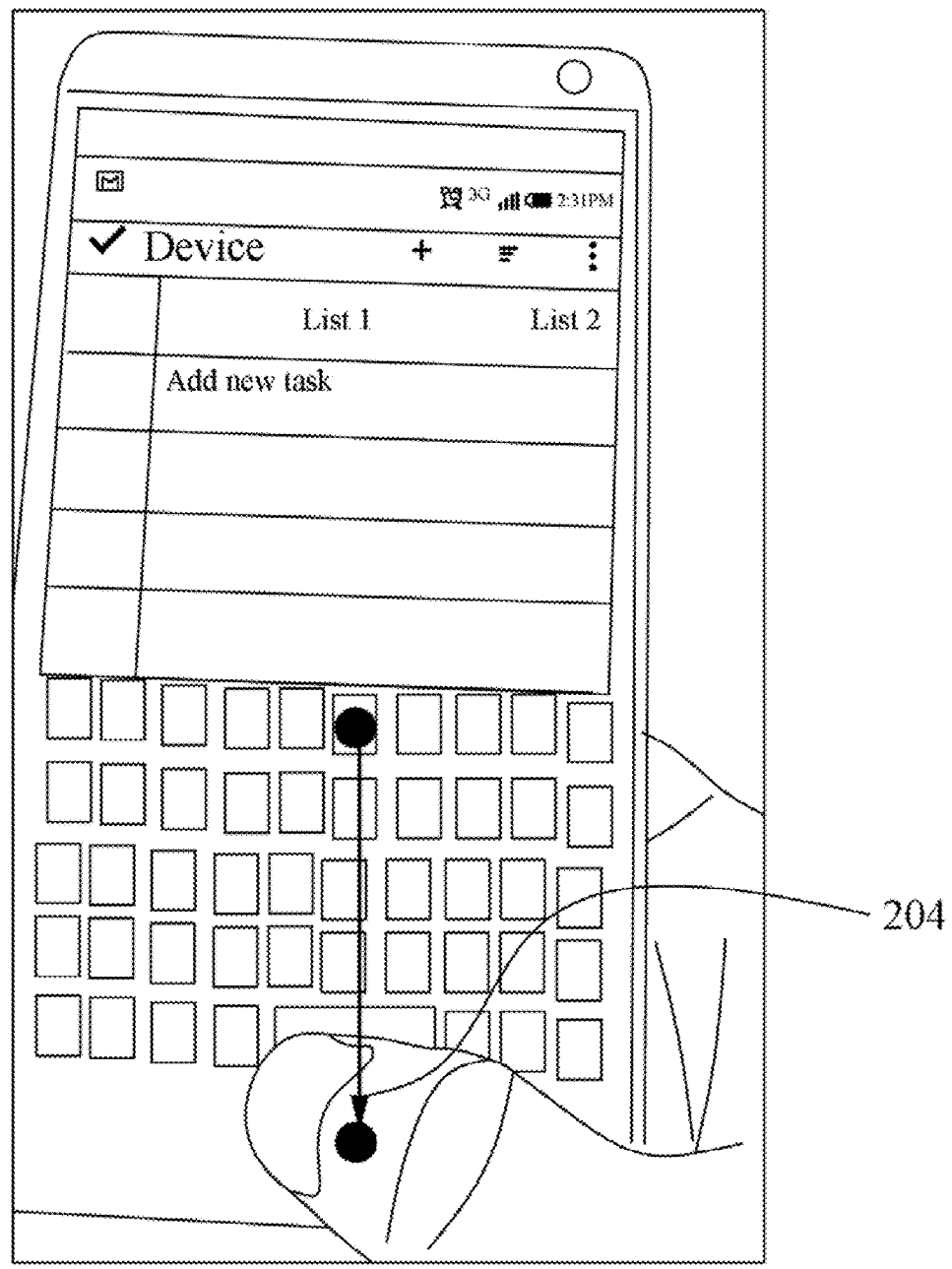
FIG. 7 is a schematic view showing determination of an upper boundary of a second soft keyboard according to an embodiment of the present disclosure.

At step S310, the processor determines a touch signal 203 generated from the single touch point applied on the touch screen, as shown in FIG. 7, to determine the upper boundary of the second soft keyboard.

At step S320, the processor determines a downward drag signal 204 of the touch signal 203 generated from the single touch point, as shown in FIG. 8, to determine a side boundary of the second soft keyboard. For example, the downward drag signal moves continuously for a distance on the first soft keyboard 202 in a direction perpendicular to (or substantially perpendicular to) a lower edge of the first soft keyboard 202, for example.

At step S340, the processor determines a click signal 206 applied on the first soft keyboard, as shown in FIG. 9, to determine a shrinking direction of the second soft keyboard. That is, the shrinking direction of the second soft keyboard is determined on whether the click signal applied on the first soft keyboard is at a left side or a right side of the swipe signal.

At step S360, the first soft keyboard is shrunk into the second soft keyboard on the touch screen according to the boundary and the shrinking direction of the second soft keyboard. For example, the upper boundary of the second soft keyboard is determined according to the touch signal 203 generated from the single touch point shown in FIG. 7; the side boundary of the second soft keyboard is determined according to the downward drag signal 204 shown in FIG. 8; and the shrinking direction of the second soft keyboard is determined according to the signal 206 shown in FIG. 9, and thus the first soft keyboard 202 is shrunk to the right side such that the first soft keyboard 202 is shrunk into the second soft keyboard 208, as shown in FIG. 10.

Alternatively, the above swipe signal and the downward drag signal may be perpendicular to (or substantially perpendicular to) the lower edge of the first soft keyboard. For example, step S220 may include the following step: the processor determines the swipe signal on the touch screen which is perpendicular to the lower edge of the first soft keyboard, to determine the boundary of the second soft keyboard. That is, the boundary of the second soft keyboard is determined according to the swipe signal which is at an arbitrary position on the touch screen and perpendicular to the lower edge of the first soft keyboard.

For example, a soft keyboard setup mode may be enabled. In the soft keyboard setup mode, the processor determines a swipe signal on the touch screen which is perpendicular to (or substantially perpendicular to) the lower edge of the first soft keyboard, to determine the boundary of the second soft keyboard; the processor determines a click signal applied on the first soft keyboard, to determine a shrinking direction of the second soft keyboard; and the first keyboard is shrunk into the second soft keyboard on the touch screen according to the boundary and the shrinking direction of the second soft keyboard.

Through the above embodiments, the height, the boundary and the position of the displayed soft keyboard may be designated, which is easy for the user's operation, and the user's experience may be improved.

Figure 12:
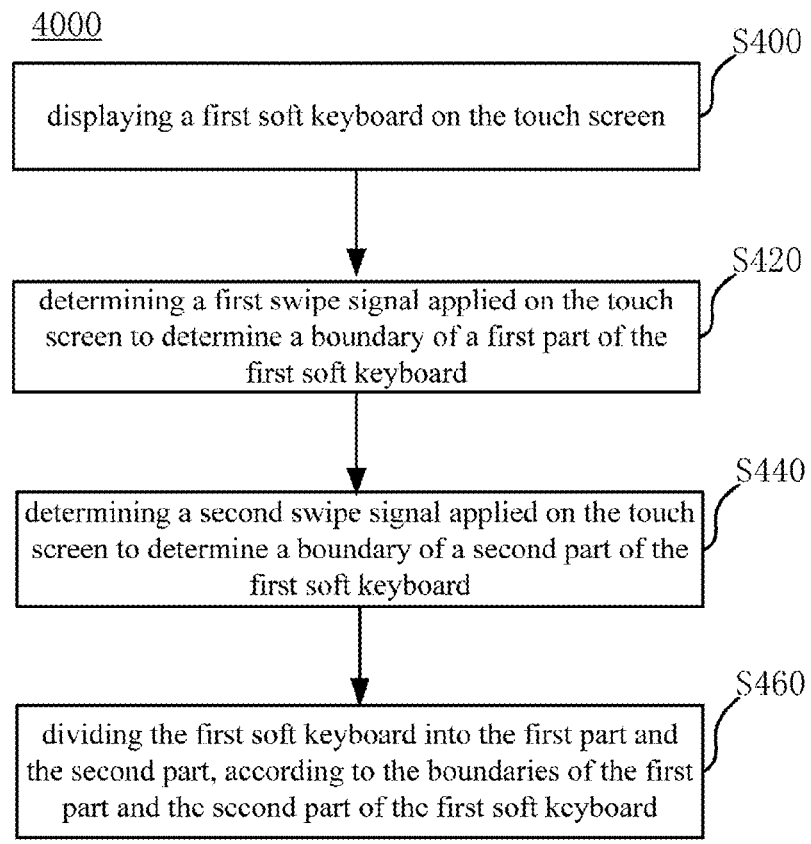
FIG. 12 is a flowchart showing a method 4000 for operating a soft keyboard of a touch device according to an embodiment of the present disclosure.
Figure 13:
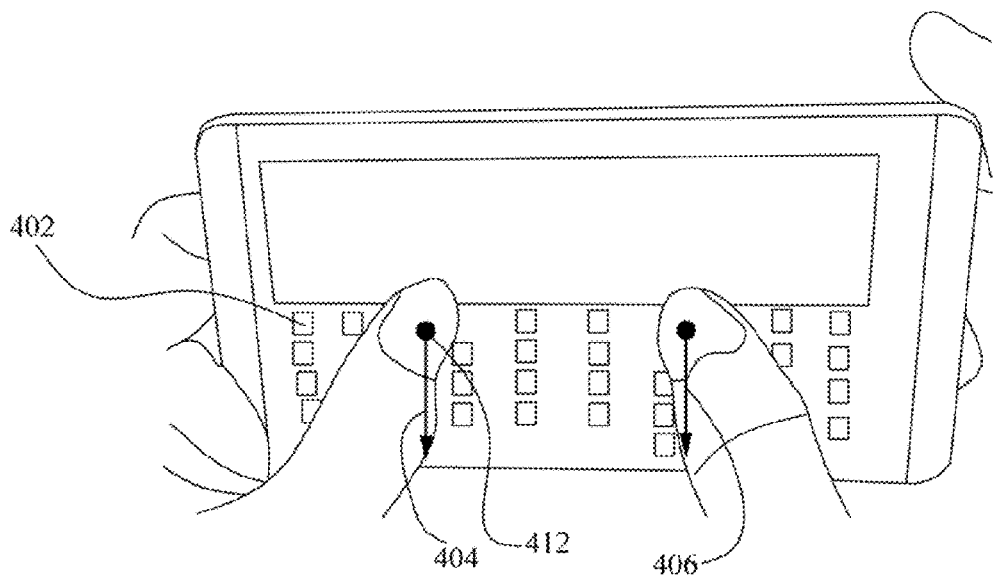
FIG. 13 is a schematic view showing the first soft keyboard displayed on a touch screen, and determination of boundaries of a first part and a second part of the first soft keyboard according to an embodiment of the present disclosure.
Figure 14:
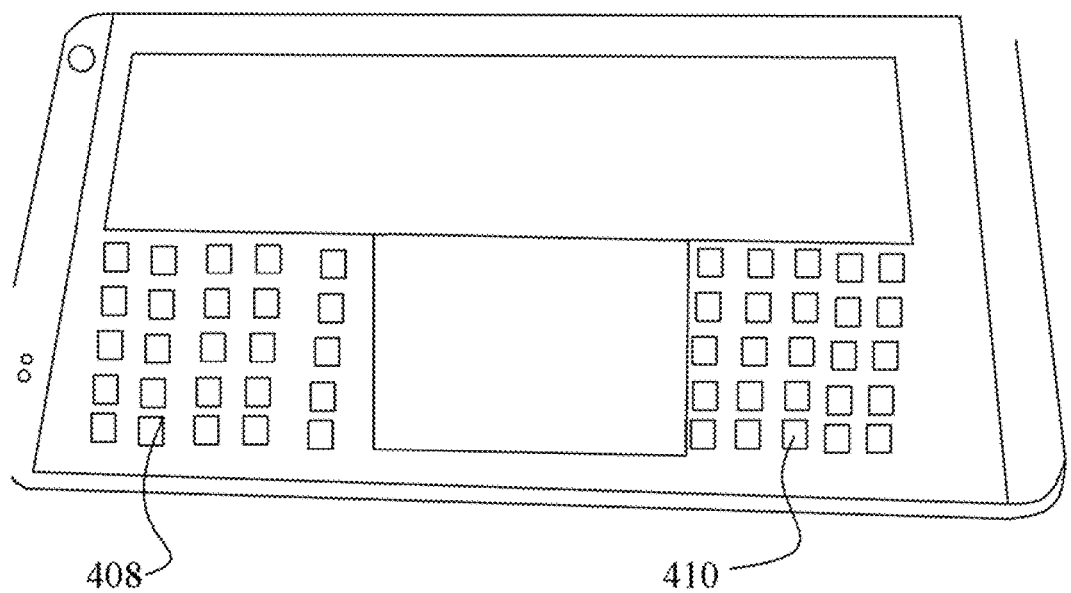
FIG. 14 is a schematic view showing the first part and the second part of the first soft keyboard according to an embodiment of the present disclosure.

FIG. 12 is a flowchart showing a method 4000 for operating a soft keyboard of a touch device according to an embodiment of the present disclosure. FIG. 13 is a schematic view showing the first soft keyboard displayed on a touch screen, and determination of boundaries of a first part and a second part of the first soft keyboard according to an embodiment of the present disclosure. FIG. 14 is a schematic view showing the first part and the second part of the first soft keyboard according to an embodiment of the present disclosure.

For example, at step S400, a first soft keyboard is displayed on the touch screen. For example, a first soft keyboard 402 is displayed on the touch screen, as shown in FIG. 13.

At step S420, the processor determines a first swipe signal applied on the touch screen to determine a boundary of a first part of the first soft keyboard. At step S440, the processor determines a second swipe signal applied on the touch screen to determine a boundary of a second part of the first soft keyboard. For example, as shown in FIG. 13, the processor determines a first swipe signal 404 and a second swipe signal 406 applied on the touch screen to respectively determine respective side boundaries of the first part and the second part of the first soft keyboard. For example, the first swipe signal 404 and the second swipe signal 406 may move continuously on the first soft keyboard 402 for a distance in the direction perpendicular to (or substantially perpendicular to) a lower edge of the first soft keyboard 402.

At step S460, the first soft keyboard is divided into the first part and the second part on the touch screen, according to the boundary of the first part and the boundary of the second part of the first soft keyboard. For example, as shown in FIG. 14, the first soft keyboard 402 is divided into a first part 408 and a second part 410 according to the side boundaries of the first part and the second part respectively determined according to the first swipe signal 404 and the second swipe signal 406 as shown in FIG. 14.

Alternatively, each of the resulted first part 408 and the second part 410 contains a part of the keys of the first soft keyboard 402. That is, the keys in the first part 408 and the keys in the second part 410 are different.

Alternatively, each of the resulted first part 408 and the second part 410 contains a part of the keys of the first soft keyboard 402, but the keys in the first part 408 and the keys in the second part 410 may be partially the same according to a predetermined condition.

Alternatively, each of the resulted first part 408 and the second part 410 contains all of the keys of the first soft keyboard 402. That is, the keys in the first part 408 are the same as that in the second part 410.

Figure 15:
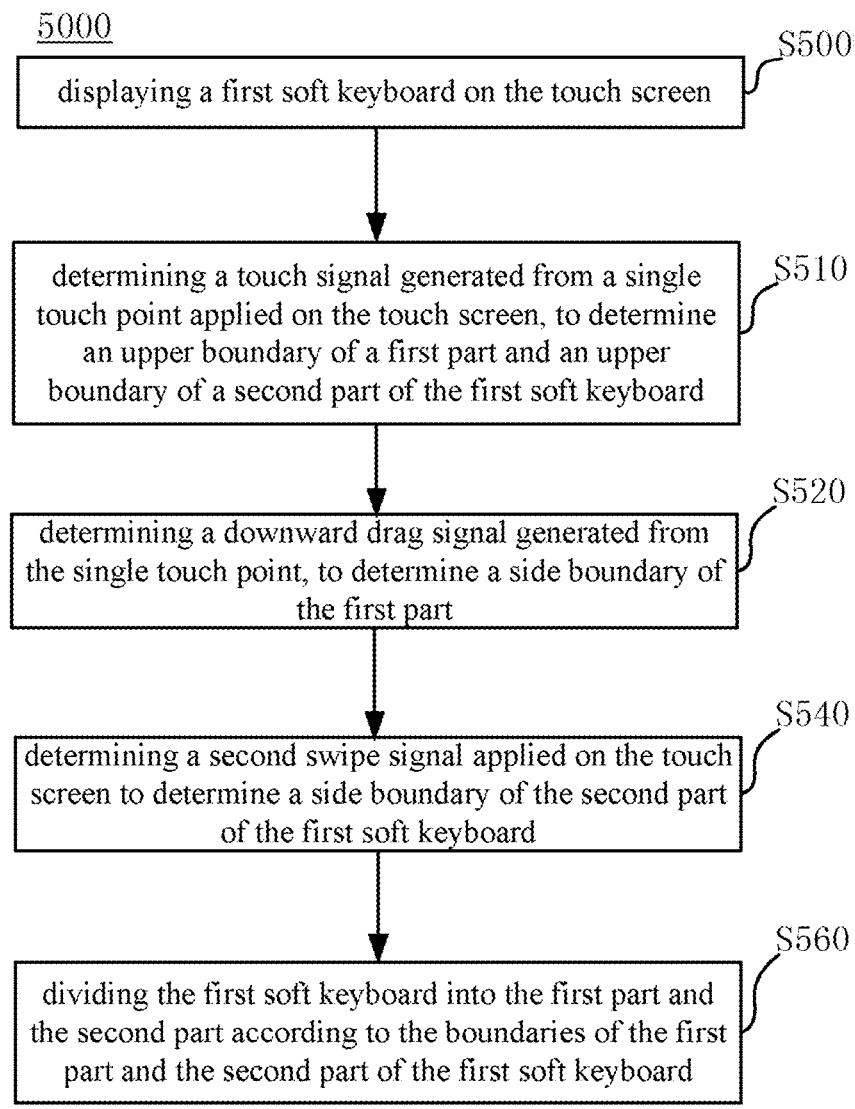
FIG. 15 is a flowchart showing a method 5000 for operating a soft keyboard of a touch device according to an embodiment of the present disclosure.

FIG. 15 is a flowchart showing a method 5000 for operating a soft keyboard of a touch device according to an embodiment of the present disclosure. As shown in FIG. 15, at step S500, a first soft keyboard is displayed on the touch screen. At step S510, the processor determines a touch signal generated from a single touch point applied on the touch screen, to determine upper boundaries of a first part and a second part of the first soft keyboard. At step S520, the processor determines a downward drag signal generated from the single touch point, to determine a side boundary of the first part. At step S540, the processor determines a second swipe signal applied on the touch screen to determine a side boundary of the second part of the first soft keyboard. At step S560, the first soft keyboard is divided into the first part and the second part on the touch screen according to the boundaries of the first part and the second part of the first soft keyboard.

For example, at step S500, a first soft keyboard 402 is displayed on the touch screen, as shown in FIG. 13.

At step S510, the processor determines a touch signal 412 generated from a single touch point applied on the touch screen, as shown in FIG. 13, to determine upper boundaries of a first part 408 and a second part 410 of the first soft keyboard 402.

At step S520, the processor determines a downward drag signal 404 generated from the single touch point, as shown in FIG. 13, so as to determine a side boundary of the first part 408 of the first soft keyboard. For example, the downward drag signal may continuously move on the first soft keyboard 402 for a distance in a direction perpendicular to (or substantially perpendicular to) a lower edge of the first soft keyboard 402, as shown in FIG. 13.

At step S540, the processor determines a swipe signal 406 applied on the touch screen to determine a side boundary of the second part of the first soft keyboard.

At step S560, side boundaries of the first part and the second part of the first soft keyboard are respectively determined according to the downward drag signal 404 and the swipe signal 406 shown in FIG. 13, so that the first soft keyboard 402 is divide into a first part 408 and a second part 410, as shown in FIG. 14.

Alternatively, the above swipe signal and the downward drag signal may be perpendicular to (or substantially perpendicular to) the lower edge of the first soft keyboard. For example, step S420 may include the following step: the processor determines the first swipe signal perpendicular to the lower edge of the first soft keyboard, to determine the boundary of the first part of the first soft keyboard. Step S440 may include the following step: the processor determines the second swipe signal perpendicular to the lower edge of the first soft keyboard, to determine the boundary of the second part of the first soft keyboard. That is, the boundaries of the first part and the second part of the first soft keyboard are respectively determined according to the first swipe signal and the second swipe signal which are at arbitrary positions on the touch screen and perpendicular to the lower edge of the first soft keyboard.

For example, a soft keyboard setup mode may be enabled. In the soft keyboard setup mode, the processor determines a first swipe signal and a second swipe signal on the touch screen which is perpendicular to (or substantially perpendicular to) the lower edge of the first soft keyboard, to respectively determine the boundaries of the first part and the second part of the first soft keyboard; and the first soft keyboard is divided into the first part and the second part on the touch screen according to the boundaries of the first part and the second part.

Through the above embodiments, a visible soft keyboard is divided into two parts, which is easy for the user's operation and the user's experience may be improved.

In some embodiment, the steps in the above methods may be combined. For example, a soft keyboard 112 is firstly generated through the method 1000, and the soft keyboard 112 is operated according to the method 2000, 3000, 4000 or 5000.

Figure 16:
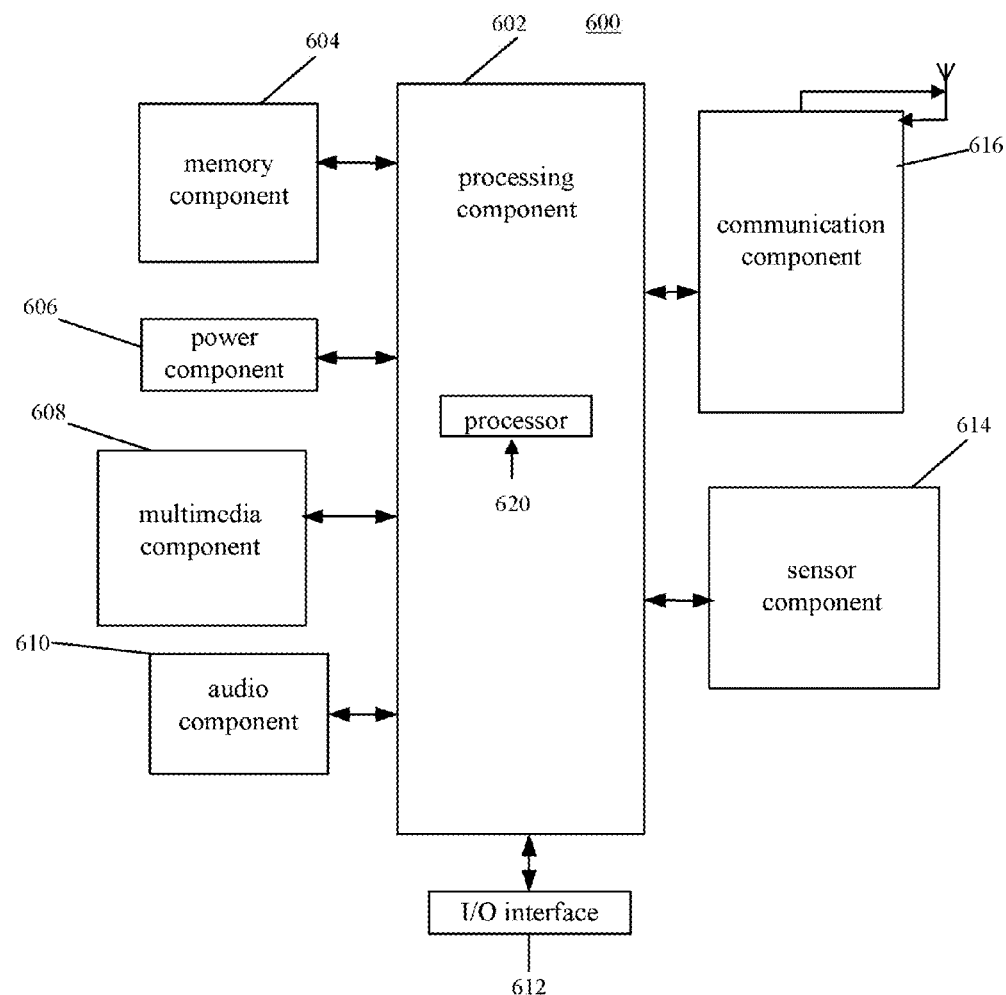
FIG. 16 is a block diagram showing a touch device 600 according to an embodiment of the present disclosure.

FIG. 16 is a block diagram showing a touch device 600 according to an embodiment of the present disclosure. The touch device 600 includes, for example, a mobile phone, a PAD, a notebook computer and the like.

As shown in FIG. 16, the touch device 600 may include one or more of the following components: a processing component 602, a memory component 604, a power component 606, a multimedia component 608, an audio component 610, an input/output (I/O) interface 612, a sensor component 614, and a communication component 616.

The processing component 602 typically controls overall operations of the touch device 600. The processing component 602 may include one or more processors to execute instructions to perform all or part of the steps in the above described methods.

The memory 604 is configured to store various types of data to support the operation of the touch device 600. Examples of such data may include instructions for any applications or methods operated on the touch device 600, contact data, phonebook data, messages, pictures, audio, video, etc. The memory 604 may include a static random access memory (SRAM), an electrically erasable programmable read-only memory (EEPROM), an erasable programmable read-only memory (EPROM), a read-only memory (ROM), a magnetic memory, a flash memory, a magnetic disk, optical disk and the like.

The power component 606 provides power to various components of the touch device 600. The power component 606 may include a power management system, one or more power sources, and any other components associated with the generation, management, and distribution of power.

The multimedia component 608 includes a screen. In some embodiments, the screen may include a liquid crystal display and a touch panel. The touch panel includes one or more touch sensors to sense gestures such as touches and swipes on the touch panel. In some embodiments, the multimedia component 608 may include a front camera and/or a rear camera.

The audio component 610 is configured to output and/or input audio signals. For example, the audio component 610 may include a microphone configured to receive an external audio signal. The received audio signal may be further stored in the memory component 604 or transmitted via the communication component 616. The audio component 610 may also include a speaker to output audio signals.

The I/O interface 612 provides an interface between the touch device 600 and peripheral devices, such as a keyboard, buttons and the like.

The sensor component 614 may include one or more sensors to provide status information on the touch device 600. For example, the sensor component 614 may include a motion sensor, configured to collect motion information on the mobile terminal. For example, the sensor component 614 may include an accelerometer, configured to collect acceleration information on the touch device 600; the sensor component 614 may also include a gyroscope, configured to collect an angular velocity information on the touch device 600; or, the sensor component 614 may also include an altimeter, configured to collect height information on the touch device 600. The sensor component 614 may also include a proximity sensor, configured to collect distance information between the touch device 600 and a surrounding object. The sensor component 614 may also include an optical sensor, a temperature sensor, a magnetic sensor, a pressure sensor and the like.

The communication component 616 is configured to facilitate communication, wired or wirelessly, between the touch device 600 and other devices. The touch device 600 can communicate based on a communication standard, such as WiFi, 3G or 4G etc. In some embodiments, the communication component 616 may include a near field communication (NFC) module to facilitate short-range communications based on a radio frequency identification (RFID) technology, an infrared data association (IrDA) technology, an ultra-wideband (UWB) technology, a Bluetooth (BT) technology, and the like In some embodiments, the touch device 600 may be implemented with application specific integrated circuits (ASICs), digital signal processors (DSPs), digital signal processing devices (DSPDs), programmable logic devices (PLDs), field programmable gate arrays (FPGAs), controllers and the like, for performing the above described methods.

In some embodiments, instructions in the memory component 604 are executed by the processing component 620 of the touch device 600, to cause the touch device 600 to execute instructions corresponding to the steps of the above-described methods. For example, a touch signal generated from a single touch point applied onto a trigger region for a soft keyboard is determined by the processing component 620; a drag signal generated through move of the single touch point from inside to outside of the trigger region is determined by the processing component 620; a starting point and an end point of the drag signal are determined by the processing component 620, to generate a soft keyboard display signal; and the soft keyboard is displayed on the touch screen according to the soft keyboard display signal.

For example, a first soft keyboard is displayed on the touch screen; a swipe signal applied on the touch screen is determined by the processing component 620 to determine a boundary of a second soft keyboard; a click signal applied on the touch screen is determined by the processing component 620 to determine a shrinking direction of the second soft keyboard; and the first soft keyboard is shrunk into the second soft keyboard on the touch screen according to the boundary and the shrinking direction of the second soft keyboard.

For example, a first soft keyboard is displayed on the touch screen; a first swipe signal applied on the touch screen is determined by the processing component 620 to determine a boundary of a first part of the soft keyboard; a second swipe signal applied on the touch screen is determined by the processing component 620 to determine a boundary of a second part of the soft keyboard; and the first soft keyboard is divided into the first part and the second part according to the boundaries of the first part and the second part of the first soft keyboard.

In some embodiments, there is also provided a non-volatile computer readable storage medium containing instructions, such as included in the above memory 604 of the touch device 600, executable by the processing component 620, for performing the above-described methods. For example, the non-volatile computer readable storage medium may be a ROM, a RAM, a CD-ROM, a magnetic tape, a floppy disc, an optical data storage device, and the like.

Figure 17:
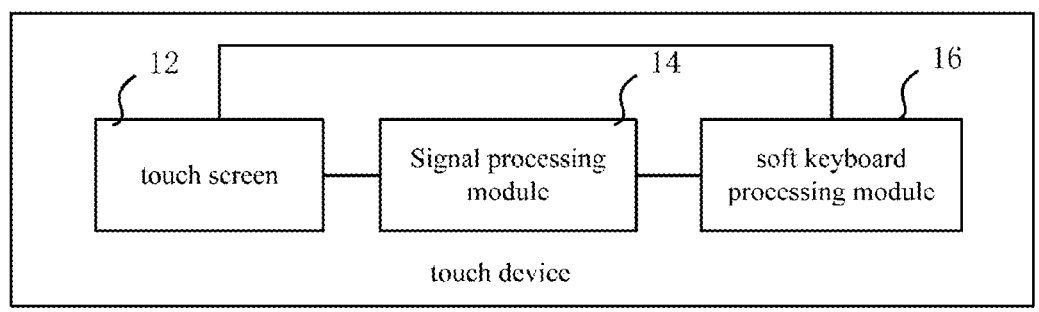
FIG. 17 is a block diagram showing a touch device 10 according to an embodiment of the present disclosure.

In some embodiments, a touch device is provided, as shown in FIG. 17. The touch device 10 may include a touch screen 12, a signal processing module 14 and a soft keyboard processing module 16.

The touch screen 12 includes a trigger region for the soft keyboard, for example, a whole input box 102 shown in FIG. 2, or a soft keyboard icon 104.

The signal processing module 14 determines a touch signal generated from a single touch point applied onto a trigger region for a soft keyboard, and determines a drag signal generated through move of the single touch point from inside to outside of the trigger region. The soft keyboard processing module 16 determines a starting point and an end point of the drag signal through the signal processing module 14, to generate a soft keyboard display signal.

For example, as shown in FIG. 2, the input box 102 in the Figure may be, for example, a trigger region for the soft keyboard. Alternatively, the trigger region for the soft keyboard may be located in the corresponding input box for the soft keyboard. Alternatively, the trigger region for the soft keyboard may include at least a part of the region of the corresponding input box for the soft keyboard, i.e. the trigger region for the soft keyboard is partially overlapped with the corresponding part of the input box for the soft keyboard. The signal processing module 14 determines a touch signal 106 generated from a single touch point applied in the input box and a drag signal 108 generated through move of the single touch point from inside of the input box to outside of the input box, as shown in FIG. 3. The soft keyboard processing module determines a starting point 106 and an end point 110 of the drag signal 108, to generate a soft keyboard display signal. The touch screen 12 displays the soft keyboard 112 according to the soft keyboard display signal, as shown in FIG. 4.

Alternatively, the soft keyboard processing module 16 takes the starting point 106 of the drag signal 108 as a first vertex of the soft keyboard, takes the end point 110 of the drag signal 108 as a second vertex of the soft keyboard, and generates a soft keyboard display signal according to a length of a diagonal which is equal to a distance from the first vertex to the second vertex of the soft keyboard.

In some embodiments, the input box 102 may include a soft keyboard icon 104 therein, as shown in FIG. 2. The signal processing module 14 determines a touch signal 106 applied on the soft keyboard icon 104, as shown in FIG. 3; and determines the drag signal 108 generated through move of the single touch point from inside of the input box to outside of the input box, as shown in FIG. 3. The soft keyboard processing module 16 takes the starting point (which is corresponding to the position of the soft keyboard icon 104) of the drag signal 108 as the first vertex of the soft keyboard, takes the end point 110 of the drag signal 108 as the second vertex, and generates a soft keyboard display signal according to the length of the diagonal of the soft keyboard which is equal to the distance from the first vertex to the second vertex of the soft keyboard. The touch screen 12 displays the soft keyboard 112 according to the soft keyboard display signal, as shown in FIG. 14.

According to the above embodiments, the size of the soft keyboard may be adjusted by determining a touch signal generated from a single touch point applied onto the trigger region for the soft keyboard and a drag signal generated through move of the single touch point from inside of the trigger region to outside of the trigger region, operation of which is easy and only needs one finger of the user.

In some embodiments, a touch device is provided, as shown in FIG. 18. The touch device 10 may include a touch screen 12, a signal processing module 14 and a soft keyboard processing module 16. The touch screen 12 displays a first soft keyboard. The signal processing module 14 determines a swipe signal applied on the touch screen to determine a boundary of a second soft keyboard; and determines a click signal applied on the touch screen to determine a shrinking direction of the second soft keyboard. The soft keyboard processing module 16 shrinks the first soft keyboard into the second soft keyboard on the touch screen according to the boundary and the shrinking direction of the second soft keyboard.

For example, the touch screen displays a first soft keyboard 202, as shown in FIG. 6.

The signal processing module 14 determines a swipe signal 204 applied on the touch screen 12, as shown in FIG. 8, to determine a side boundary of the second soft keyboard. For example, the swipe signal 204 moves continuously on the first soft keyboard 202 for a distance in a direction perpendicular to a lower edge of the first soft keyboard 202. Alternatively, the signal processing module 14 may determines a swipe signal which moves continuously on the first soft keyboard for a distance in a direction substantially perpendicular to a lower edge of the first soft keyboard 202, so as to determine a side boundary of the second soft keyboard.

The signal processing module 14 also determines a click signal 206 applied on the first soft key board 202, as shown in FIG. 9, to determine a shrinking direction of the second soft keyboard. That is, the signal processing module 14 determines the shrinking direction of the second soft keyboard according to whether the click signal applied on the first soft keyboard is at which side of the swipe signal.

The soft keyboard processing module 16 shrinks the first soft keyboard into the second soft keyboard according to the boundary and the shrinking direction of the second soft keyboard. For example, the signal processing module 14 determines the side boundary of the second soft keyboard according to the swipe signal 204 shown in FIG. 8, and determines the shrinking direction of the second soft keyboard according to the click signal 206 shown in FIG. 9. The click signal 206 is located on the right side of the swipe signal 204 as shown in FIG. 9, therefore, the soft keyboard processing module 16 shrinks the first soft keyboard 202 to the right side, so as to shrink the first soft keyboard 202 into the second soft keyboard 208, as shown in FIG. 10. Alternatively, a size of each key of the first soft keyboard 202 is shrunk according to a ratio between the size of the first soft keyboard and the size of the second soft keyboard.

Alternatively, the signal processing module 14 determines a touch signal generated from a single touch point applied on the touch screen to determine an upper boundary of the second soft keyboard, and determines a downward drag signal generated from the single touch point, to determine a side boundary of the second soft keyboard.

For example, a first soft keyboard 202 is displayed on the touch screen 12, as shown in FIG. 6.

The signal processing module 14 determines a touch signal 203 generated from the single touch point applied on the touch screen 12, as shown in FIG. 7, to determine the upper boundary of the second soft keyboard. The signal processing module 14 also determines a downward drag signal 204 of the touch signal 203 from the single touch point, as shown in FIG. 8, to determine the side boundary of the second soft keyboard, for example, the downward drag signal moves continuously for a distance on the first soft keyboard 202 in a direction perpendicular to (or substantially perpendicular to) a lower edge of the first soft keyboard 202. The signal processing module 14 also determines a click signal 206 applied on the first soft keyboard, as shown in FIG. 9, to determine a shrinking direction of the second soft keyboard.

The soft keyboard processing module 16 shrinks the first soft keyboard into the second soft keyboard according to the boundary and the shrinking direction of the second soft keyboard.

Alternatively, the above swipe signal and the downward drag signal may be perpendicular to (or substantially perpendicular to) the lower edge of the first soft keyboard. For example, a soft keyboard setup mode may be enabled. In the soft keyboard setup mode, the signal processing module 14 determines a swipe signal on the touch screen 12 which is perpendicular to (or substantially perpendicular to) the lower edge of the first soft keyboard, to determine the boundary of the second soft keyboard; and determines a click signal applied on the first soft keyboard, to determine a shrinking direction of the second soft keyboard. The soft keyboard processing module 16 shrinks the first soft keyboard into the second soft keyboard according to the boundary and the shrinking direction of the second soft keyboard.

Through the above embodiments, the height, the boundary and the position of the displayed soft keyboard may be designated, which is easy for the user's operation, and the user's experience may be improved.

In some embodiments, a touch device is provided, as shown in FIG. 18. The touch device 10 may include a touch screen 12, a signal processing module 14 and a soft keyboard processing module 16. The touch screen 12 displays a first soft keyboard. The signal processing module 14 determines a first swipe signal applied on the touch screen 12 to determine a boundary of a first part of the first soft keyboard; and determines a second swipe signal applied on the touch screen 12 to determine a boundary of a second part of the first soft keyboard. The soft keyboard processing module 16 divides the first soft keyboard into the first part and the second part according to the boundaries of the first part and the second part of the first soft keyboard.

For example, a first soft keyboard 402 is displayed on the touch screen 12, as shown in FIG. 13.

The signal processing module 14 determines a first swipe signal 404 and a second swipe signal 406 applied on the touch screen 12 to respectively determine side boundaries of the first part and the second part of the first soft keyboard. For example, the first swipe signal 404 and the second swipe signal 406 may move continuously on the first soft keyboard 402 for a distance in the direction perpendicular to (or substantially perpendicular to) a lower edge of the first soft keyboard 402.

The soft keyboard processing module 16 divides the first soft keyboard 402 into a first part 408 and a second part 410, according to the side boundaries of the first part and the second part respectively determined according to the first swipe signal 404 and the second swipe signal 406 as shown in FIG. 14.

Alternatively, each of the resulted first part 408 and the second part 410 contains a part of the keys of the first soft keyboard 402. That is, the keys in the first part 408 and the keys in the second part 410 are different.

Alternatively, each of the resulted first part 408 and the second part 410 contains a part of the keys of the first soft keyboard 402, but the keys in the first part 408 and the keys in the second part 410 may be partially the same according to a predetermined condition.

Alternatively, each of the resulted first part 408 and the second part 410 contains all of the keys of the first soft keyboard 402. That is, the keys in the first part 408 are the same as that in the second part 410.

Alternatively, the signal processing module 14 determines a touch signal generated from a single touch point applied on the touch screen 12, to determine an upper boundary of a first part and an upper boundary of a second part of the first soft keyboard. The signal processing module 14 also determines a downward drag signal generated from the single touch point, to determine a side boundary of the first part; and determines a second swipe signal applied on the touch screen 12 to determine a side boundary of the second part of the first soft keyboard.

For example, a first soft keyboard 402 is displayed on the touch screen, as shown in FIG. 13.

The signal processing module 14 determines a touch signal 412 generated from a single touch point applied on the touch screen 12, as shown in FIG. 13, to determine upper boundaries of a first part 408 and a second part 410 of the first soft keyboard 402. The signal processing module 14 determines a downward drag signal 404 generated from the single touch point, as shown in FIG. 13, so as to determine a side boundary of the first part 408 of the first soft keyboard. For example, the downward drag signal may continuously move on the first soft keyboard 402 for a distance in a direction perpendicular to (or substantially perpendicular to) a lower edge of the first soft keyboard 402, as shown in FIG. 13. The signal processing module 14 determines a swipe signal 406 applied on the touch screen to determine a side boundary of the second part of the first soft keyboard.

The soft keyboard processing module 16 divides the first soft keyboard 402 into a first part 408 and a second part 410 according to the side boundaries of the first part and the second part, as shown in FIG. 14.

Alternatively, the above swipe signal and the downward drag signal may be perpendicular to (or substantially perpendicular to) the lower edge of the first soft keyboard. For example, a soft keyboard setup mode may be enabled. In the soft keyboard setup mode, the signal processing module 14 determines a first swipe signal and a second swipe signal on the touch screen which is perpendicular to (or substantially perpendicular to) the lower edge of the first soft keyboard, to respectively determine the boundaries of the first part and the second part of the first soft keyboard. The soft keyboard processing module 16 divides the first soft keyboard into the first part and the second part according to the boundary of the first part and the boundary of the second part.

Through the above embodiments, a visible soft keyboard is divided into two parts, which is easy for the user to operate and the user's experience may be improved.

What is claimed is:

1. A method for operating a soft keyboard of a touch device, the touch device comprising a touch screen and a processor, the touch screen being coupled to the processor, and the method comprising:

displaying a first soft keyboard on the touch screen;
determining, by the processor, a swipe signal applied on the touch screen to determine a boundary of a second soft keyboard, comprising:
determining, by the processor, the entire swipe signal is perpendicular to a lower edge of the first soft keyboard and moves continuously on the first soft keyboard, to determine the boundary of a second soft keyboard;
determining, by the processor, a click signal applied on the touch screen to determine a shrinking direction of the second soft keyboard, comprising:
the processor determining the click signal applied on the first soft keyboard to determine the shrinking direction of the second soft keyboard; and
shrinking the first soft keyboard into the second soft keyboard on the touch screen according to the boundary and the shrinking direction of the second soft keyboard in one integrated operation.

2. A touch device comprising:
a touch screen comprising a trigger region for a soft keyboard;
a memory configured to store computer executable instructions; and
a processor coupled to the touch screen and configured to execute the computer executable instructions to cause the device to perform:
displaying a first soft keyboard on the touch screen;
determining, by the processor, a swipe signal applied on the touch screen to determine a boundary of a second soft keyboard, comprising:
determining, by the processor, the entire swipe signal is perpendicular to a lower edge of the first soft keyboard and moves continuously on the first soft keyboard, to determine the boundary of a second soft keyboard;
determining, by the processor, a click signal applied on the touch screen to determine a shrinking direction of the second soft keyboard, comprising:
the processor determining the click signal applied on the first soft keyboard to determine the shrinking direction of the second soft keyboard; and
shrinking the first soft keyboard into the second soft keyboard on the touch screen according to the boundary and the shrinking direction of the second soft keyboard in one integrated operation.

* * * * *